United States Patent
Yao et al.

(10) Patent No.: US 9,645,688 B2
(45) Date of Patent: May 9, 2017

(54) OGS TOUCH SCREEN SUBSTRATE AND METHOD OF MANUFACTURING THE SAME, AND RELATED APPARATUS

(71) Applicant: BOE TECHNOLOGY GROUP CO., LTD., Beijing (CN)

(72) Inventors: Qi Yao, Beijing (CN); Feng Zhang, Beijing (CN); Zhanfeng Cao, Beijing (CN); Zhen Liu, Beijing (CN); Xiaolong He, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/769,094

(22) PCT Filed: Jan. 22, 2015

(86) PCT No.: PCT/CN2015/071317
§ 371 (c)(1),
(2) Date: Aug. 19, 2015

(87) PCT Pub. No.: WO2016/045278
PCT Pub. Date: Mar. 31, 2016

(65) Prior Publication Data
US 2016/0252997 A1    Sep. 1, 2016

(30) Foreign Application Priority Data
Sep. 23, 2014  (CN) .......................... 2014 1 0490434

(51) Int. Cl.
*G06F 3/044* (2006.01)
(52) U.S. Cl.
CPC .... *G06F 3/044* (2013.01); *G06F 2203/04103* (2013.01)
(58) Field of Classification Search
None
See application file for complete search history.

(56) References Cited

U.S. PATENT DOCUMENTS

| 2010/0066650 A1 | 3/2010 | Lee et al. |
| 2010/0283757 A1 | 11/2010 | Wu et al. |
| 2015/0062455 A1* | 3/2015 | Hao ........................ G06F 3/044 349/12 |

FOREIGN PATENT DOCUMENTS

| CN | 101751181 A | 6/2010 |
| CN | 202171790 U | 3/2012 |

(Continued)

OTHER PUBLICATIONS

International Search Report and Written Opinion in Chinese for PCT Application No. PCT/CN2015/071317 dated May 27, 2015, 10 pages.

(Continued)

*Primary Examiner* — Kenneth B Lee, Jr.
(74) *Attorney, Agent, or Firm* — Kinney & Lange, P.A.

(57) ABSTRACT

The present invention discloses a touch screen substrate and a method of manufacturing the same. The touch screen substrate includes a capacitance layer comprising a plurality of electrodes, a first cover layer formed on the capacitance layer; a plurality of conductive bridges located on the first cover layer and configured to be electrically connected to a part of the electrodes that are electrically isolated; and a plurality of electrical connection lines, configured to respectively be electrically connected to the respective conductive bridge so as to electrically connect the first electrode with a touch detecting circuit. A material layer for forming the electrical connection lines is different from a material layer for forming the conductive bridges such that the conductive bridges located below the electrical connection lines are not corroded when the material layer for the electrical connection lines is etched. Utilization of different chemical prop- (Continued)

erties of copper and silver nanowires and ITO material and inclusion of a single patterning process increase productivity and yield.

11 Claims, 5 Drawing Sheets

(56) References Cited

FOREIGN PATENT DOCUMENTS

| CN | 202533920 U | 11/2012 |
|---|---|---|
| CN | 202632243 U | 12/2012 |
| CN | 102880350 A | 1/2013 |
| CN | 103376927 A | 10/2013 |
| CN | 103455203 A | 12/2013 |
| CN | 103500036 A | 1/2014 |
| CN | 203480464 A | 3/2014 |
| CN | 203480464 U | 3/2014 |
| CN | 203480465 A | 3/2014 |
| CN | 203480465 U | 3/2014 |
| CN | 10402134 A | 9/2014 |
| CN | 104252278 A | 12/2014 |

OTHER PUBLICATIONS

First Chinese Office Action dated Sep. 2, 2016, for corresponding Chinese Application No. 201410490434.4.
First Chinese Office Action, for Chinese Patent Application No. 201410490434.4, dated Jan. 24, 2017, 11 pages.

\* cited by examiner

OGS TOUCH SCREEN SUBSTRATE AND METHOD OF MANUFACTURING THE SAME, AND RELATED APPARATUS

BACKGROUND

Technical Field

The present invention relates to the field of touch screen, and particularly to an OGS touch screen substrate, a method of manufacturing a touch screen substrate, a display apparatus including a touch screen, and more particularly to a process of forming a capacitance layer by silver nanowires and of forming bridges by copper.

Description of the Related Art

A touch screen, serving as a smart man-machine interface product, has been applied widely in many applications of daily life and production, particularly in consumer electronics products (such as, smart mobile phone, tablet, etc.).

The touch screen mainly includes resistance type, capacitance type, infrared type and surface acoustic type touch screens. A capacitance type touch screen has advantages of rapid response, multi-touch and long lifetime and thus becomes current main technology in market.

An OGS (One Glass Solution) capacitance touch screen has advantages of more simply in structure, lighter in weight, thinner in thickness and better in light transmittance than a double-glass (G/G) touch screen. Further, as the OGS touch screen may be produced by saving one glass substrate as well as an assembling and bonding procedure, it can be made at reduced cost and increased yield.

Figure 1:
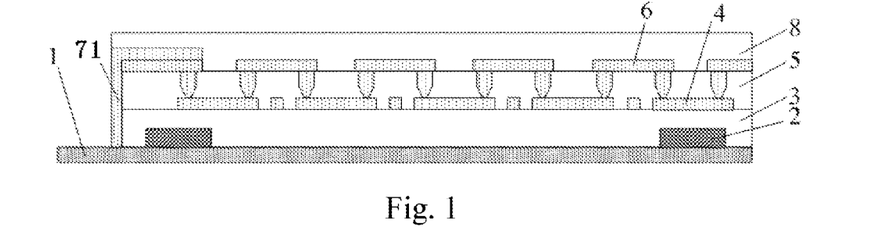
FIG. 1 is a side sectional view of a conventional touch screen substrate.

Conventional OGS touch screen substrate is structurally shown in FIG. 1. FIG. 1 is a sectional view of the touch screen substrate along a side direction. As shown in FIG. 1, the touch screen substrate includes a cover lens 1 and a light shielding layer 2 formed on the cover lens 1. The light shielding layer 2 on the cover lens 1 is patterned as a rectangle pattern which thus is also termed as black matrix (BM). A flat layer 3 is covered over the cover lens 1 and the light shielding layer 2 such that the cover lens 1 that has been applied the light shielding layer 2 is maintained in flatness. In the OGS touch screen substrate, the flat layer 3 may not be provided, in order for increasing light transmittance and saving procedure cost. Then, a transparent capacitance layer 4 is formed on the flat layer 3, and an over coat layer 5 is covered over the transparent capacitance layer 4. Subsequently, conductive bridges 6 are formed on the first cover layer 5, in which the conductive bridges 6 are connected to the transparent capacitance layer 4 via conductive lines formed in the through holes of the first cover layer 5, thereby enabling the transparent capacitance layers 4 arranged in a direction (for example, in left-right direction as shown in FIG. 1) to be electrically connected. In addition, an electrical connection line 71 is formed at a side face of the first cover layer 5 and the flat layer 2, for connection to a touch detecting circuit.

FIGS. 2A~2F are side sectional views of the touch screen substrate during a conventional manufacturing process.

Figure 2A:
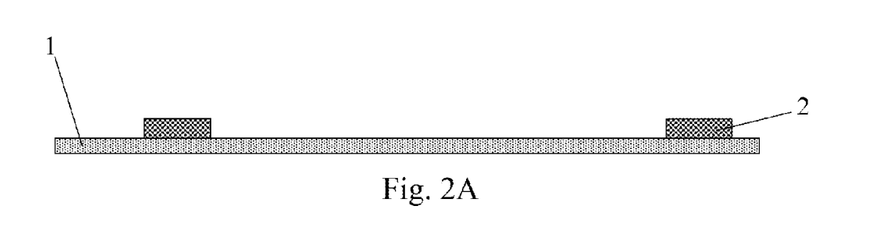
FIGS. 2A~2F are side sectional views of the conventional touch screen substrate during a conventional manufacturing process.

Firstly, as shown in FIG. 2A, a light shielding layer 2 is formed on a cover lens 1. The light shielding layer 2 may be formed using printing ink or black metal layer, through a silk screen printing process or through a vacuum magnetron sputtering process.

Figure 2B:
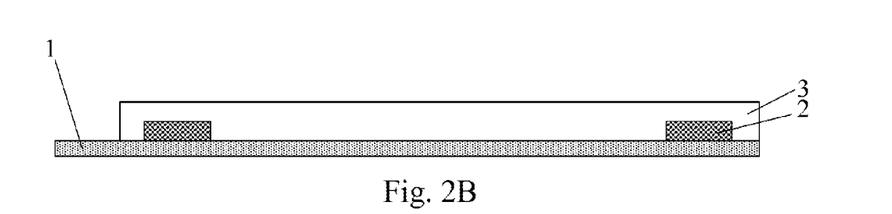

Then, as shown in FIG. 2B, a flat layer 3 is formed on the cover lens 1 and the light shielding layer 2. The flat layer 3 is made of transparent insulating material, such as $SiO_2$, by, such as, a vacuum magnetron sputtering process.

Figure 2C:
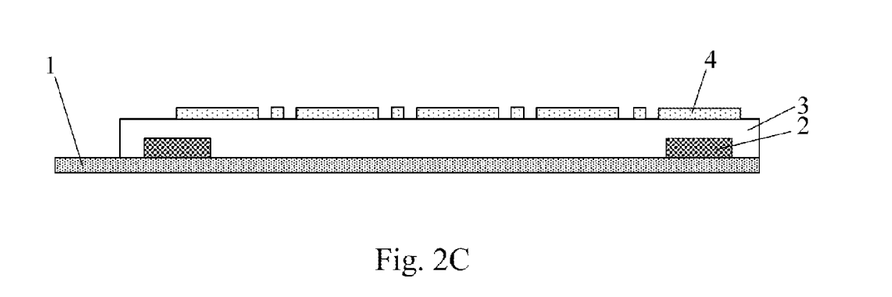

Followed by, as shown in FIG. 2C, a transparent capacitance layer 4 is formed on the flat layer 3 through a patterning process. For example, the transparent capacitance layer 4 is made of transparent materials, such as ITO material, through patterning processes including steps of coating, exposing, developing, hardening, etching, stripping and the like.

Figure 2D:
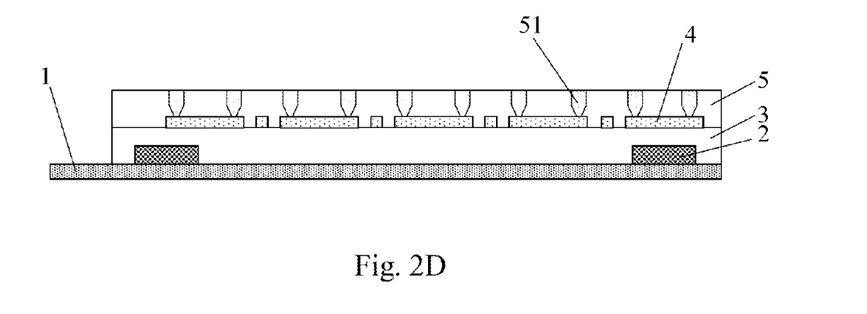

Then, as shown in FIG. 2D, a first cover layer 5 is applied on the flat layer 3, on which a transparent capacitance layer 4 is formed, and through holes 51 are formed in the first cover layer 5 through an etching process so as to connect the transparent capacitance layer 4.

Figure 2E:
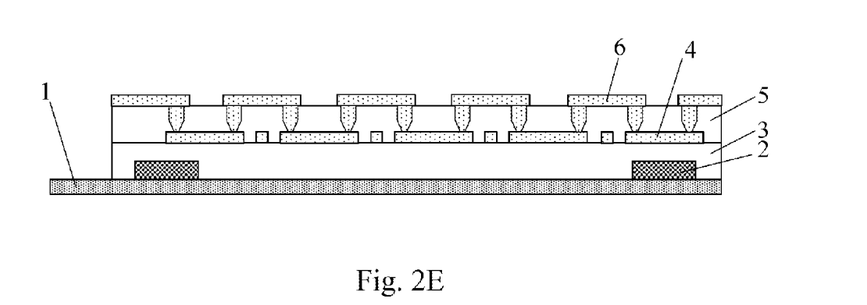

Then, as shown in FIG. 2E, a conductive connection line is formed using ITO material through a second patterning process, such that the conductive bridges 6 bridge two adjacent capacitance electrodes, such as the electrodes extending in a left-right direction. The second patterning process includes steps of coating, exposing, developing, hardening, etching, stripping and the like.

Figure 2F:
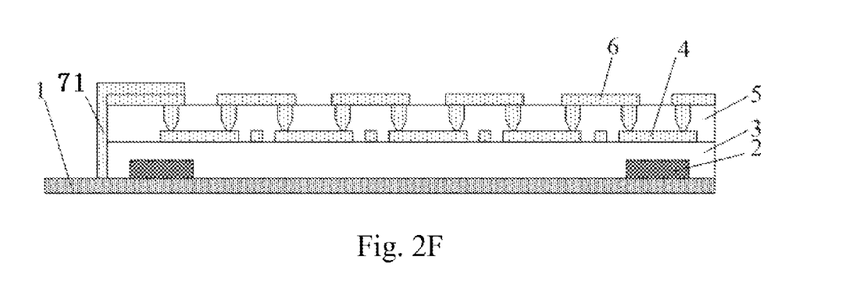

Thereafter, as shown in FIG. 2F, an electrical connection line 71 is formed on a side face of the first cover layer 5 and the flat layer 2. The electrical connection line may be also made of ITO material.

Finally, a second cover layer 8 is formed on the first cover layer 5, obtaining the OGS touch screen substrate as shown in FIG. 1.

It can be seen from the above that, the transparent capacitance layer 4 and the conductive bridges 6 are formed using the ITO thin films through two patterning processes, and each of the patterning processes includes steps of coating, exposing, developing, hardening, etching, stripping and the like. Further, a similar patterning process may be employed to form the electrical connection line 71. Thus, the conventional process of manufacturing a touch screen substrate becomes complex and thus leads to a rather low yield.

SUMMARY

Accordingly, it is a main object of the present invention to provide a touch screen substrate and a method of manufacturing the same so as to simplify manufacturing process and increase yield.

In an embodiment of an aspect of the present invention, there is provided a touch screen substrate, comprising: a capacitance layer comprising a plurality of electrodes; a first cover layer formed on the capacitance layer; a plurality of conductive bridges located on the first cover layer and configured to be electrically connected to a part of the plurality of electrodes that are electrically isolated; and a plurality of electrical connection lines configured to respectively be electrically connected to the respective conductive bridge so as to electrically connect the first electrode with a touch detecting circuit. A material layer for forming the electrical connection lines is different from a material layer for forming the conductive bridges such that the conductive bridges located below the electrical connection lines are not corroded when the material layer for the electrical connection lines is etched.

In the touch screen substrate according to an embodiment of the present invention, the electrical conductive bridges are made of ITO or nanoscale silver and the electrical connection lines are made of copper.

In the touch screen substrate according to an embodiment of the present invention, the capacitance layer is made of nanoscale silver.

In the touch screen substrate according to an embodiment of the present invention, the electrodes comprise a plurality of first electrodes and a plurality of second electrodes that are arranged across each other, and each of the conductive bridges crosses the corresponding second electrode and electrically connects two adjacent first electrodes via a through hole formed in the first cover layer.

In an embodiment of another aspect of the present invention, there is provided a method of manufacturing the touch screen substrate according to the above embodiment, and the method comprises steps of:

forming the material layer for the conductive bridges and the material layer for the electrical connection lines on the first cover layer in sequence, and forming the conductive bridges and the electrical connection lines simultaneously by a single patterning process.

In the method according to an embodiment of the present invention, the conductive bridges are made of ITO or nanoscale silver, and the electrical connection lines are made of copper.

In the method according to an embodiment of the present invention, the capacitance layer is made of nanoscale silver.

In an embodiment of a further aspect of the present invention, there is provided a touch screen comprising the touch screen substrate according to any one of the above embodiments.

In an embodiment of a still aspect of the present invention, there is provided a display apparatus comprising the touch screen according to the above embodiments.

In an embodiment of still another aspect of the present invention, there is provided a method of manufacturing a touch screen, comprising the steps of the method of manufacturing the touch screen substrate according to any one of the above embodiments.

In an embodiment of yet another aspect of the present invention, there is provided a method of manufacturing a display apparatus, comprising the steps of the method of manufacturing the touch screen according to the above embodiments.

The embodiments of the present invention provide a touch screen substrate and a method of manufacturing a touch screen substrate, in which the electrical connection line and the conductive bridges are formed by a single patterning process by means of utilization of different chemical properties of copper, nanoscale silver and ITO materials, thereby improving productivity and yield. In addition, as the nanoscale silver has a much lower resistance than ITO, the present invention is advantageously applied in large-size touch-sensitive OGS panels.

DETAILED DESCRIPTION OF EMBODIMENTS

According to the present invention, it is proposed that a capacitance layer is made of nanoscale silver, and through holes and conductive bridges are made of nanoscale silver or ITO while electrical connection lines are made of a different material, for example, copper. As the conductive bridges and the electrical connection lines are designed to be made of different materials, they may be formed through an ashing and etching process, thereby simplifying the process.

In order to make the object, technical solutions and advantages of the present invention more clear, the embodiments of the present invention are illustrated and described in detailed by reference to the accompanying drawings.

Figure 3:
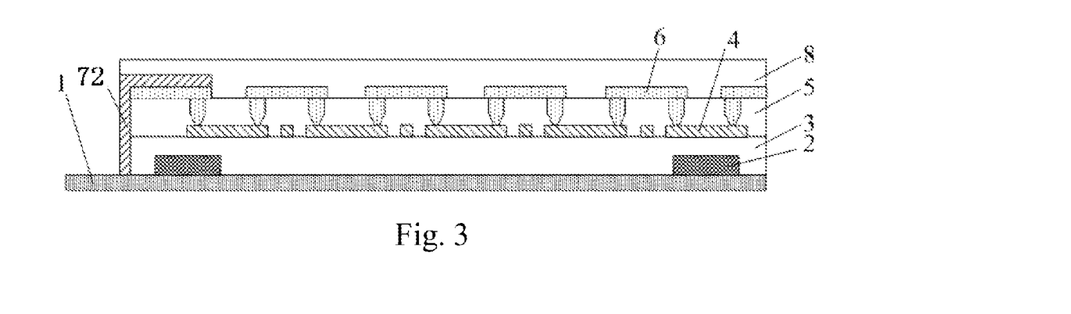
FIG. 3 is a side sectional view of a touch screen substrate according to an embodiment of the present invention.

FIG. 3 is a side sectional view of a touch screen substrate of an embodiment of the present invention. As shown in FIG. 3, the touch screen substrate includes a capacitance layer including a plurality of electrodes; a first cover layer 5 formed on the capacitance layer; a plurality of conductive bridges 6 disposed on the first cover layer 5 and configured to electrically connect a part of electrodes that are electrically isolated; and, a plurality of electrical connection lines 72 configured to respectively be electrically connected to the conductive bridge 6 so as to electrically connect the first electrodes 41 with the touch detecting circuit (not shown). The electrical connection lines 72 and the conductive bridges 6 are made by different material layers, such that the conductive bridges 6 located below the electrical connection lines 72 are not etched when the material layer for making the electrical connection lines is etched. Since the electrical connection lines 72 and the conductive bridges 6 are made of different materials, an ashing and etching process may be used during the manufacturing, thereby simplifying the process.

In an embodiment, the plurality of electrodes include a plurality of first electrodes 41 and a plurality of second electrodes 42 that are arranged across and insulated from each other. Each of the conductive bridges 6 crosses the corresponding second electrode 42, and connects two adjacent first electrodes 41 via through holes 51 formed in the first cover layer 5.

In addition, as shown in FIG. 3, the touch screen substrate according to the embodiment of the present invention further includes a cover plate 1; a light shielding layer 2 and a plat layer 3 formed on the cover plate 1, and a capacitance layer formed on the plat layer 3.

According to an exemplary embodiment of the present invention, a capacitance layer 4 is formed on a flat layer 3 made of nanoscale silver. Through holes 51 are formed in the first cover layer 5 and are filled with an ITO material, and the ITO material are further formed into conductive bridges 6. An electrical connection line 72 is made of copper.

In a further embodiment of the present invention, the method of manufacturing a touch screen substrate according to the above embodiments, comprising: in the step of forming conductive bridges 6 and electrical connection lines 72, forming a material layer for making the conductive bridges 6 and a material layer for making the electrical connection lines 72 on the first cover layer 5 in sequence, and forming the conductive bridges 6 and the electrical connection lines 72 through a single patterning process.

FIGS. 4A~4F are side sectional views of the touch screen substrate in a process of manufacturing the touch screen substrate according to an embodiment of the present invention. A method of manufacturing the touch screen substrate is illustrated with reference to FIGS. 4A~4F.

Figure 4A:
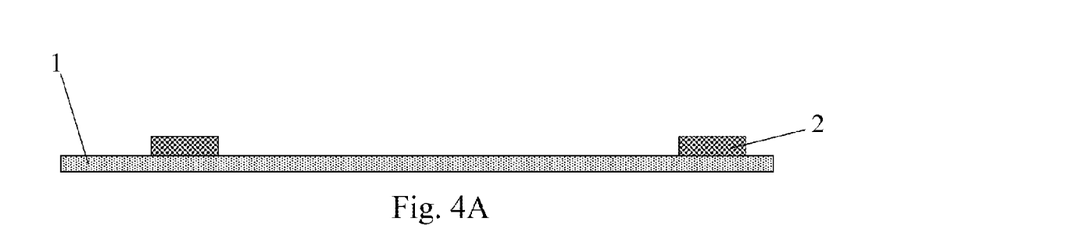
FIGS. 4A~4F are side sectional views of the touch screen substrate during a process of manufacturing the touch screen substrate according to the embodiment of the present invention.

Firstly, as shown in FIG. 4A, a light shielding layer 2 is formed on a glass cover plate 1. The light shielding layer 2 may be formed using ink or black metal layer through a silk screen printing process or a vacuum magnetron sputtering process.

Figure 4B:
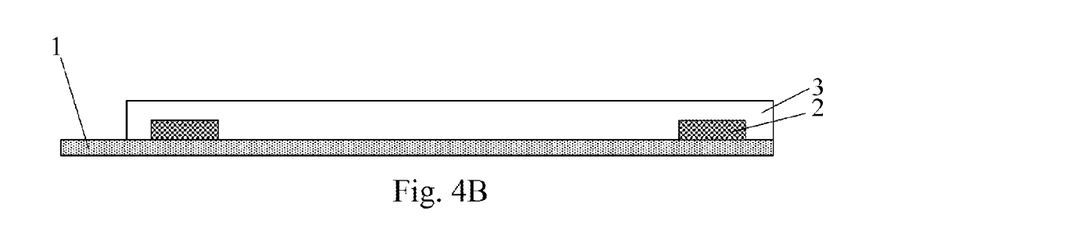

Then, as shown in FIG. 4B, a flat layer 3 is formed on the glass cover plate 1 and the light shielding layer 2. The flat layer 3 is made of a transparent insulating material, such as $SiO_2$, through, such as, a vacuum magnetron sputtering process.

Figure 4C:
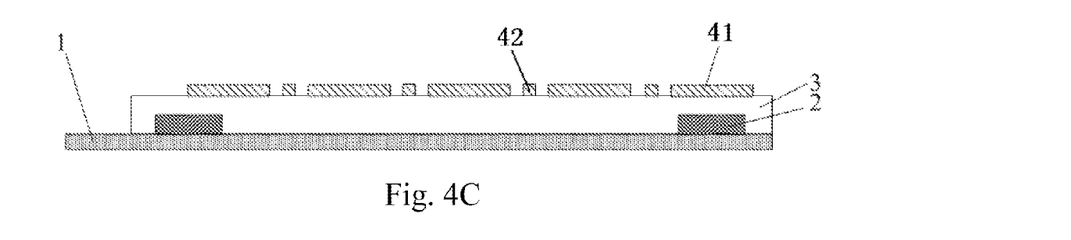

Subsequently, as shown in FIG. 4C, a capacitance layer 4 is made by nanoscale silver on the flat layer 3. The nanoscale silver is formed through a first patterning process which includes steps of coating, exposing, developing, hardening, etching and stripping, etc. An etching solution for the nanoscale silver mainly includes $HNO_3$ and $H_3PO_4$, etc.

Figure 4D:
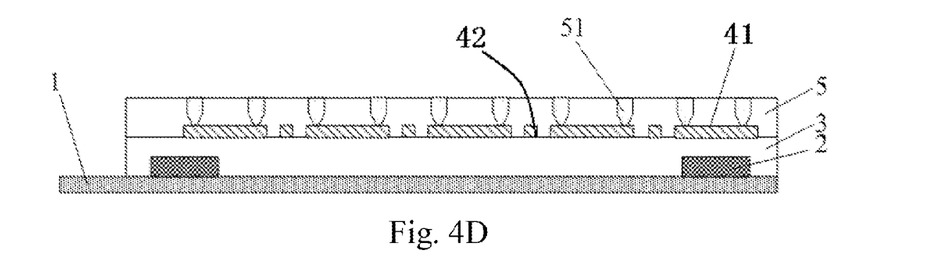

Then, as shown in FIG. 4D, a first cover layer 5 is applied on the capacitance layer 4, and through holes 51 are formed in the cover layer 5. The first cover layer 5 is configured for protecting the capacitance layer made of nanoscale silver.

Figure 4E:
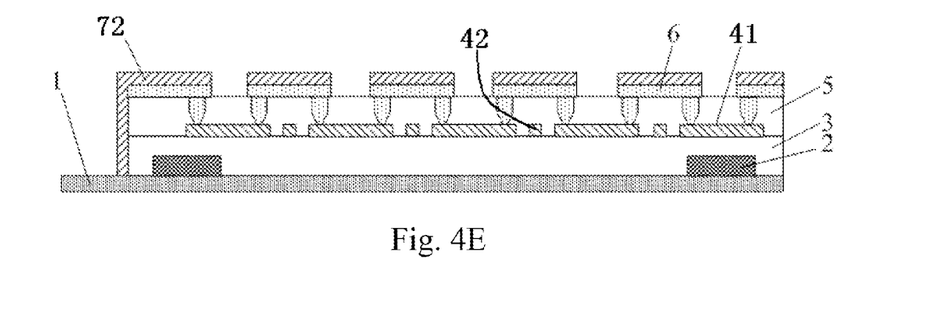

Then, as shown in FIG. 4E, an ITO material is applied to fill the through holes 51 and further forms a material layer for the conductive bridge 6, while a copper material layer is formed on the material layer for the conductive bridges. Specifically, in this step, the ITO material layer and the copper material layer may be formed on the first cover layer 5 in sequence through a vacuum sputter process, in which the ITO material fills the through holes 51 and the ITO material layer has a thickness in a range from about 200 Å about 1000 Å; and the copper material layer is directly formed on the ITO material layer and has a thickness in a range from about 2500 Å to about 5000 Å.

Figure 4F:
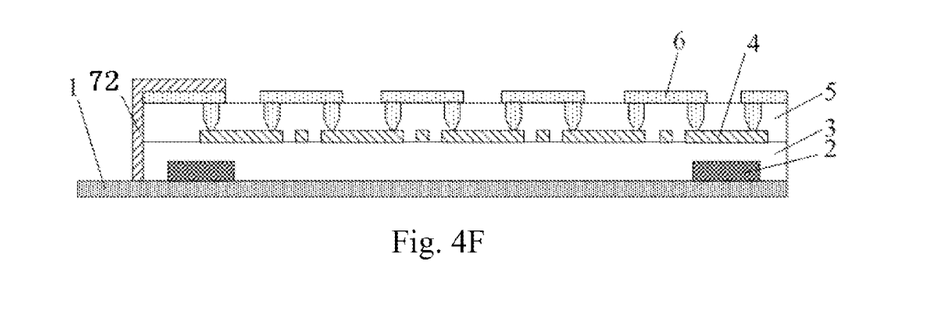

Subsequently, as shown in FIG. 4F, the copper material layer within pixel region is removed ITO material layer by a halftone or a grey scale mask plate through a second patterning process, while remaining the conductive bridges 6 (i.e., the ITO layer) which cross the through holes. Due to different chemical properties of the ITO material and copper, the ITO material layer located in a lower position will not be influenced and corroded when the copper material layer is etched. That is, the peripheral electrical connection line 72 and a circuit including the bridges, i.e., conductive bridges 6 of OGS may be produced through a single patterning process. The etching solution for etching copper material layer may be an etching solution mainly including $H_2O_2$ and the etching solution for etching ITO material layer may mainly include $H_2SO_4$ and $H_3PO_4$.

Finally, a second cover layer 8 is formed on the first cover layer 5 for covering the electrical connection lines 72 and the conductive bridges 6, thereby obtaining the OGS touch screen substrate as shown in FIG. 3.

Figure 5:
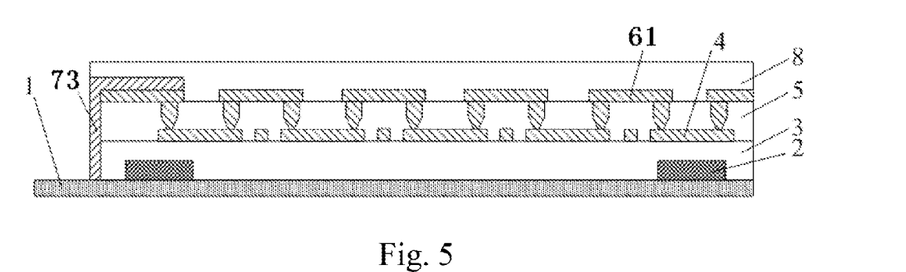
FIG. 5 is a side sectional view of a touch screen substrate according to another embodiment of the present invention.

FIG. 5 is a side sectional view of a touch screen substrate according to an embodiment of the present invention. As shown in FIG. 5, compared with the above embodiment, conductive bridges 61 are made of nanoscale silver in this embodiment.

Due to different chemical properties of the copper and silver, this embodiment includes similar steps as those of the first embodiment. That is, a nanoscale silver material layer for forming the conductive bridges 61 and a copper material layer for forming the electrical connection lines 73 are formed in sequence on the first cover layer 5 through a sputtering process. Manufactures of the conductive bridges 61 and the electrical connection lines 73 are completed through a single patterning process, based on a factor that the copper material layer and the nanoscale silver material layer may be selectively etched by an etching solution.

The touch screen substrate and the method of manufacturing the same are illustrated in the above two embodiments. However, it is appreciated that the present invention may also include other embodiments, such as, an embodiment in which the capacitance layer 4 may be made of other materials, such as ITO material, instead of the nanoscale silver mentioned in the above embodiments.

In addition, the present invention further provides a touch screen manufactured through the above touch screen substrate, a display apparatus, a method of manufacturing a touch screen including the above method of manufacturing a touch screen substrate, and a method of manufacturing a display apparatus.

The embodiments of the present invention provide a touch screen substrate and a method of manufacturing s touch screen substrate, in which the electrical connection lines and the conductive bridges are formed through a single patterning process by utilization of different chemical properties of copper and silver nanowires and ITO material, thereby improving productivity and yield. In addition, as the nanoscale silver has a much lower resistance than ITO, the present invention is advantageously applied in large-size touch-sensitive OGS panels.

Although several exemplary embodiments of the present invention have been shown and described for object, solutions and effects of the present invention, it would be appreciated by those skilled in the art that various changes or modifications may be made in these embodiments without departing from the principles and spirit of the present invention, the scope of which is defined in the claims and their equivalents.

What is claimed is:

1. A touch screen substrate, comprising:
   a capacitance layer, comprising a plurality of electrodes;
   a first cover layer formed on the capacitance layer;
   a plurality of conductive bridges located on the first cover layer and configured to be electrically connected to a part of the plurality of electrodes that are electrically isolated; and
   a plurality of electrical connection lines, configured to respectively be electrically connected to a respective conductive bridge so as to electrically connect the first electrode with a touch detecting circuit;
   wherein a material layer for forming the electrical connection lines is different from a material layer for forming the conductive bridges such that the conductive bridges located below the electrical connection lines are not corroded when the material layer for the electrical connection lines is etched.

2. The touch screen substrate according to claim 1, wherein the electrical conductive bridges are made of indium tin oxide (ITO) or nanoscale silver and the electrical connection lines are made of copper.

3. The touch screen substrate according to claim 2, wherein the capacitance layer is made of nanoscale silver.

4. The touch screen substrate according to claim 1, wherein the plurality of electrodes comprises a plurality of first electrodes and a plurality of second electrodes that are arranged across each other, and each of the conductive bridges crosses a corresponding second electrode and electrically connects two adjacent first electrodes via a through hole formed in the first cover layer.

5. A method of manufacturing the touch screen substrate according to claim 1, the method comprising:
   forming the material layer for the conductive bridges and the material layer for the electrical connection lines on the first cover layer in sequence, and forming the conductive bridges and the electrical connection line through a single patterning process.

6. The method according to claim 5, wherein the conductive bridges are made of indium tin oxide (ITO) or nanoscale silver, and the electrical connection lines are made of copper.

7. The method according to claim 6, wherein the capacitance layer is made of nanoscale silver.

8. A touch screen, comprising the touch screen substrate according to claim 1.

9. A display apparatus, comprising the touch screen according to claim 8.

10. A method of manufacturing a touch screen, comprising the steps of the method according to claim 5.

11. A method of manufacturing a display apparatus, comprising the steps of the method according to claim 10.

* * * * *